United States Patent [19]

Pommier

[11] 4,265,291

[45] May 5, 1981

[54] RADIAL CARCASS TIRE EMPLOYING CARCASS EXPANSION LIMITING BLOCK

[75] Inventor: Jean Pommier, Clermont-Ferrand, France

[73] Assignee: Compagnie Generale des Etablissements Michelin, Clermont-Ferrand, France

[21] Appl. No.: 117,035

[22] Filed: Jan. 30, 1980

Related U.S. Application Data

[63] Continuation-in-part of Ser. No. 19,179, Mar. 9, 1979, abandoned.

[30] Foreign Application Priority Data

Mar. 10, 1978 [FR] France .................................. 78 7385

[51] Int. Cl.³ ........................ B60C 9/20; B60C 9/08
[52] U.S. Cl. ........................ 152/352 R; 152/354 R; 152/359; 152/361 FP; 152/361 DM
[58] Field of Search ..... 152/361 R, 361 FP, 361 DM, 152/352 R, 352 A, 353 R, 354 R, 359

[56] References Cited

U.S. PATENT DOCUMENTS

| | | | |
|---|---|---|---|
| 2,884,040 | 4/1959 | Boussu et al. | 152/356 |
| 3,018,814 | 1/1962 | Saint-Paul | 152/361 |
| 3,515,197 | 6/1970 | Boileau | 152/361 R |
| 3,976,115 | 8/1976 | Mirtain et al. | 152/361 R |
| 4,006,766 | 2/1977 | Takayanagi et al. | 152/354 R |
| 4,016,916 | 4/1977 | Ravagnani | 152/361 R |

FOREIGN PATENT DOCUMENTS

| | | | |
|---|---|---|---|
| 1142709 | 9/1957 | France | 152/361 |
| 808824 | 2/1959 | United Kingdom | 152/361 |

*Primary Examiner*—Caleb Weston
*Assistant Examiner*—Lois E. Boland
*Attorney, Agent, or Firm*—Brumbaugh, Graves, Donohue & Raymond

[57] ABSTRACT

A tire with a radial carcass reinforcement and a tread reinforcement of at least two crossed plies is improved due to the fact that between the radial carcass reinforcement and the tread reinforcement there is arranged a limiting block formed of two crossed plies whose wires or cables form opposite angles with the longitudinal direction, each of which is other than zero and less than one-quarter of the smallest angle used in the tread reinforcement.

12 Claims, 3 Drawing Figures

FIG. 1A
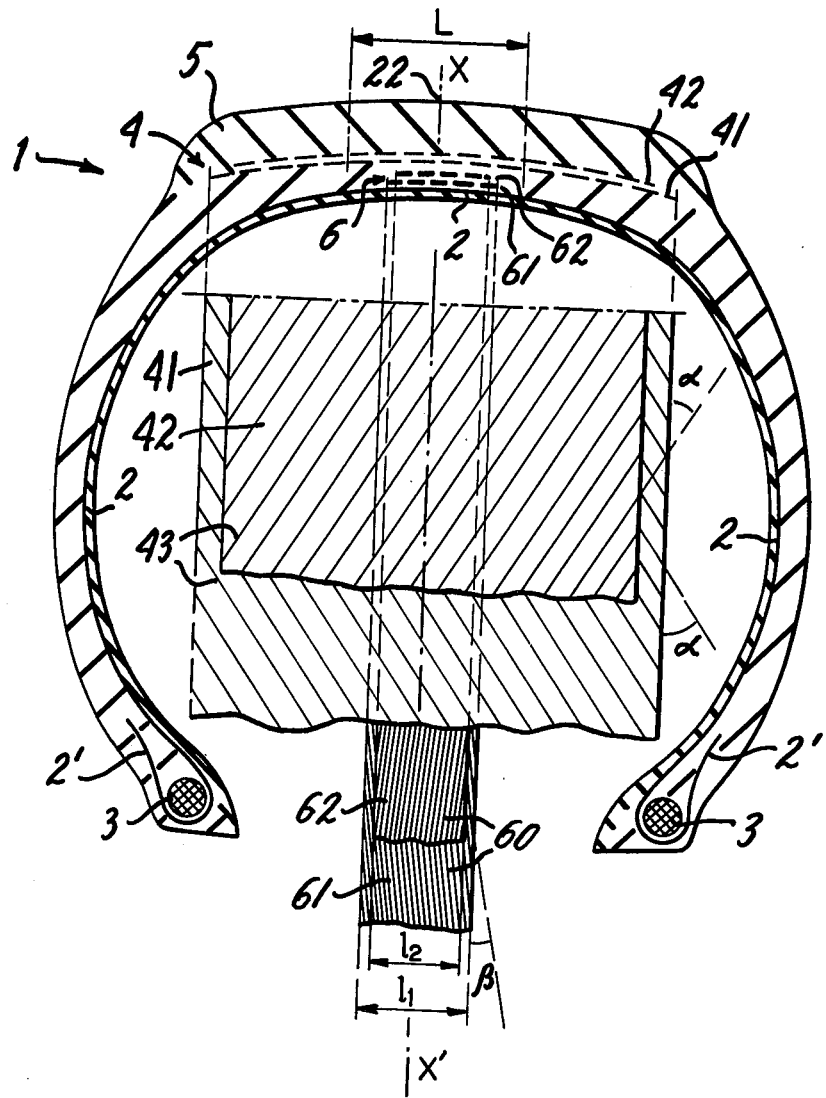
FIG. 1B
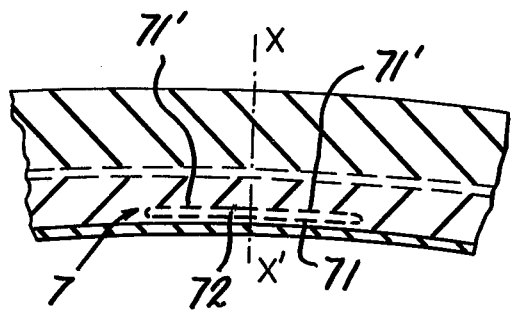
FIG. 2

RADIAL CARCASS TIRE EMPLOYING CARCASS EXPANSION LIMITING BLOCK

This application is a continuation-in-part application of U.S. application Ser. No. 19,179, filed Mar. 9, 1979, now abandoned.

The present invention relates to improvements in tires with a radial carcass reinforcement and a crown reinforcement formed of at least two plies of wires or cables parallel in each ply and crossed from one ply to the other forming acute angles with the longitudinal direction of the tire.

In tires of the type in question, the crown reinforcement, on the one hand, is tangent to the carcass reinforcement along an equatorial zone of a width less than that of the crown reinforcement. On the other hand, the crown reinforcement has the function essentially of stiffening the tread against deformations due to travel under load. However, it is known that the radial carcass reinforcement arranged on the inside of the crown reinforcement naturally tends to assume in the equatorial zone, under the effect of the inflation pressure, a meridian curvature and a diameter which are greater than those of the crown reinforcement, the tire being mounted on a rim but not under load.

In practice, these deformations of the crown plies do not make it possible to use crown plies arranged at angles equal to or greater than 30°. Such an arrangement is of interest when road wear is less important for the life of the tread than the destruction of the tread by objects which cut and/or nibble the rubber of the tread.

In this case, it is advisable to make the crown more flexible as compared with that of a road tire. Furthermore, the ground on which such tires travel is customarily less adhesive, since it is formed essentially of mineral debris, crushed stones, rocks, etc., or of dry or moist pulverulent materials containing stones or rocks. In this case also crown plies arranged at angles at least equal to 30° make it possible to impart sufficient mobility to the relief elements of the tread. One thus obtains satisfactory adherence and improves the expulsion of the clods which adhere to the tread.

The solution (French Pat. No. 1,142,704 which corresponds to U.S. Pat. No. 2,884,040) which consists in imparting to the crown reinforcement a meridian curvature close to that of the carcass reinforcement led to a premature separation between the plies.

The object of the present invention is to overcome the above-described drawbacks by neutralizing the placing under tension of the crown reinforcement which is caused by the inflation pressure. This crown reinforcement thus becomes essentially a tread reinforcement.

In accordance with the invention, the radial tire of the type in question, with a tread reinforcement whose meridian curvature is less than that of the radial carcass reinforcement and whose plies form angles equal to or greater than 30° with the longitudinal direction of the tire is characterized by the fact that between the radial carcass reinforcement and the tread reinforcement there is arranged a limiting block formed of two superimposed plies of wires or cables of low extensibility which are parallel to each other in each ply and crossed from one ply to the other forming with the longitudinal direction angles of opposite sign, each being both other than zero and less in absolute value than one quarter of the smallest angle used in the tread reinforcement and preferably between 5° and 10°, the width of the limiting block being at most equal to the width of the equatorial zone along which the tread reinforcement is parallel to the radial carcass reinforcement, and the limiting block being arranged in the equatorial zone and centered on the equatorial plane.

The existence of this zone of parallelism of the tread reinforcement and the radial carcass reinforcement is due to the fact that the tread reinforcement has a diameter less than that which the radial carcass reinforcement would assume in the absence of a tread reinforcement under the effect of the inflation pressure. The width of this zone increases with the difference between these two diameters. The width becomes practically zero when the two diameters are equal, except for the thicknesses of the layers of rubber and the plies of cables, of course.

In order to retain the properties of the tread reinforcement it is important that the width of the expansion limiting block formed by the two plies in accordance with the invention be between 60% and less than 100% of the width of the equatorial zone along which the tread reinforcement is parallel to the carcass reinforcement. Preferably, the width of the limiting block is between 5% and 80% of the maximum axial width of the tire and more particularly between 12% and 20% for a ratio H/B close to 1, between 24% and 40% for a ratio H/B close to 0.75, and between 45% and 80% for a ratio H/B close to 0.3, H being the radial height of the tire on its rim and B the maximum axial width of the tire, these two dimensions being measured in accordance with the customary standards.

It is also advantageous to arrange the transition between the edges of the limiting block and the tread reinforcement and carcass reinforcement. For this purpose, one of the plies has edges which are slightly recessed with respect to the other ply. The difference in width is at most equal to 10% of the width of the widest ply.

In accordance with another variant, the limiting block is formed of a single folded ply.

In order to screen off as well as possible the transmission of tensions coming from the pressure of the carcass reinforcement and taking into account the fact that no ply reinforcement element, even of steel or of glass fibers, is inextensible in actual practice, the invention provides for arranging the reinforcement elements of the plies of the limiting block at an angle other than zero with respect to the circumferential direction. The crossed plies have in fact a tendency to decrease the meridian curvature of the limiting block under the effect of an internal pressure.

The tension T per unit of width measured in the axial direction exerted on a ply by the radial carcass reinforcement can be evaluated in first approximation by the formula $T = p \cdot R / 2 \cos^2 \alpha$. In this formula, p is the inflation pressure of the tire, R is the radius of the ply with respect to the axis of rotation of the tire and $\alpha$ is the angle of the cables of the ply with the longitudinal direction. This formula indicates why the invention contemplates use in the limiting block of angles $\alpha$ less than one-quarter of the smallest angle used in the tread reinforcement. Thus, the tension T of a ply of the limiting block is always less than the tension of the ply having the smallest angle in the tread reinforcement. The elongation of the limiting block under the effect of the tension coming from the radial carcass reinforcement is thus less. This avoids transmitting this tension to the tread reinforcement.

By wires or cables of low extensibility there are understood wires or cables, preferably metallic, for instance of steel, having a relative elongation $\Delta l/l$ less than 0.2% under a load equal to 10% of their rupture load. These cables can be produced with a high cable lay which is between 12 and 20 times the apparent diameter of the cable. These wires or cables are preferably arranged contiguous to each other.

Various embodiments of the invention are described below with reference to the drawing, in which:

FIG. 1A shows a tire provided with a limiting block composed of two plies, seen in radial section, alongside of which in FIG. 1B is a plan view of the plies of wires or cables, essential for an understanding of the invention, and FIG. 2 is a view in radial section on a larger scale through a limiting block composed of a single folded ply.

The tire 1 shown in FIG. 1A comprises a radial carcass reinforcement 2 formed of a ply of steel cables whose ends 2' are turned up around the bead ring 3. Below the tread 5 there are arranged the tread reinforcement 4 and the limiting block 6 in accordance with the invention.

The tread reinforcement 4 is parallel to the carcass reinforcement 2 along an equatorial zone of the width L, centered on the equator. The equator 22 of the tire 1 is formed by its intersection with the straight line X–X', the trace of the equatorial plane on the plane of the drawing. The meridian curvature of the tread reinforcement 4 is clearly less than the corresponding curvature of the carcass reinforcement 2.

The tread reinforcement 4 is formed of two crossed superimposed plies of wires or cables 41 and 42, each forming an angle $\alpha$ greater than 30° with the longitudinal direction parallel to the trace X–X' of the equatorial plane.

The limiting block 6 is formed of two crossed, superimposed plies 61 and 62 of wires or cables of low extensibility each forming with the longitudinal direction an angle $\beta$ which is between 5° and 10° in absolute value. This limiting block 6 is parallel to the radial carcass reinforcement 2. The ply 61 adjacent the radial carcass reinforcement 2 has a width $l_1$ greater than the width $l_2$ of the ply 62. However, the width L of the equatorial zone of parallelism between the radial carcass reinforcement 2 and the tread reinforcement 4 is greater than the overall width $l_1$ of the limiting block 6. The limiting block 6 is centered on the equatorial plane of trace X–X', between the reinforcements 2 and 4.

For clarity of the drawing, the wires or cables of the tread reinforcement 4 are represented, in the plan view (FIG. 1B) adjacent the radial section (FIG. 1A), by straight lines 43 which are spaced widely apart from each other. The wires or cables 60 of the plies 61, 62 forming the limiting block 6 are represented in the same manner, but the lines are closer together in order to point out that preferably these plies 61 and 62 are each formed of wires or cables which are as close as possible to each other.

The tire shown only in part in FIG. 2 differs from that of FIG. 1A by the fact that its limiting block 7 is formed of a ply 71 whose two edges have been folded radially outward to form two flaps 71' whose total length is equal to that of the unfolded portion 71 so that these flaps meet; in this example, the line along which they meet does not coincide with the trace X–X' of the median plane of the tire and is indicated by the reference number 72. In a variant (not shown) the ply 71 is folded on itself.

Although in the foregoing and in the claims which follow reference is made to the smallest angle used in the plies of the tread reinforcement with respect to the longitudinal direction, the invention applies just as well in the event that the plies in question form equal angles (in absolute value) with said direction, so that the angle which the wires or cables of the limiting block form with the longitudinal direction must be smaller than the angle (and no longer the smallest angle) of the plies of the tread reinforcement.

It is also useful to employ a limiting block 6 consisting of two crossed plies 61, 62, the wires or cables 60 of which make different angles $\beta$ in absolute value while remaining of opposite sign. The advantage of such asymmetrical arrangement is to correct, if necessary, lateral (axial) nonuniformity thrusts induced by the tread reinforcement 4, or to prevent, especially in cases where a relatively wide limiting block 6 is used, the generation of such nonuniformity thrusts by the limiting block 6 itself. These thrusts may disturb the vehicle behavior and cause uneven wear of the tread 5.

In fact, a limiting block 6 formed by two symmetrically disposed plies 61, 62 (e.g., at angle $+\beta$ and $-\beta$) basically generates such harmful thrusts, because the two plies 61, 62 are not located at the same distance from the axis of rotation of the tire 1. Consequently, a limiting block 6 which does not generate lateral thrusts has its wires or cables 60 disposed at asymmetrical angles $\beta$. By preference, the limiting block-ply 61, the wires or cables 60 of which are oriented at the greater angle should be disposed radially inside the other ply 62. A satisfactory angular arrangement is thus 8° for the radially inner ply 61 and 3° for the radially outer ply 62.

What is claimed is:

1. A tire with a radial carcass reinforcement anchored on both sides to at least one bead ring and with a tread reinforcement formed of at least two superimposed plies of wires or cables parallel in each ply and crossed from one ply to the other forming angles greater than 30° with the longitudinal direction of the tire, said tread reinforcement having a meridian curvature less than that of the radial carcass reinforcement and being parallel to the radial carcass reinforcement along an equatorial zone of a width less than that of the tread reinforcement, characterized by the fact that between the radial carcass reinforcement and the tread reinforcement there is arranged a limiting block formed of two superimposed plies of wires or cables of low extensibility which are parallel to each other in each ply and crossed from one ply to the other forming with the longitudinal direction angles of opposite sign, each being both other than zero and less in absolute value than one-quarter of the smallest angle used in the tread reinforcement, the width of the limiting block being at most equal to the width of the equatorial zone along which the tread reinforcement is parallel to the radial carcass reinforcement, the limiting block being arranged in the equatorial zone and centered on the equatorial plane and further characterized by the fact that the wires or cables of low extensibility of the limiting block have a relative elongation less than 0.2% under a load equal to 10% of their rupture load.

2. The tire according to claim 1, characterized by the fact that the opposite angles formed by the wires or cables of the two plies of the limiting block are asymmetrical with the longitudinal direction of the tire.

3. The tire according to claim 2, characterized by the fact that the wires or cables of the radially inner ply of the limiting block form a greater angle than that of the wires or cables of the radially outer ply of the limiting block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of the limiting block are symmetrical with the longitudinal direction of the tire.

6. The tire according to claim 2 or claim 5, characterized by the fact that the opposite angles formed by the wires or cables of the two plies of the limiting block are between 5° and 10° in absolute value.

7. The tire according to claim 2 or claim 5, characterized by the fact that the width of the limiting block is between 60% and 100% of the width of the equatorial zone along which the tread reinforcement and the radial carcass reinforcement are parallel.

8. The tire according to claim 2 or claim 5, characterized by the fact that the width of the limiting block is between 5% and 80% of the maximum axial width of the tire and more particularly between 12% and 20% for a ratio H/B close to 1, between 24% and 40% for a ratio H/B close to 0.75, and between 45% and 80% for a ratio H/B close to 0.3, H being the radial height of the tire on its rim and B the maximum axial width of the tire.

9. The tire according to claim 2 or claim 5, characterized by the fact that one of the plies of the limiting block is narrower than the other ply, the difference in width being at most equal to 10% of the widest ply.

10. The tire according to claim 5, characterized by the fact that the limiting block is formed of a ply whose edges are folded so as to join each other, or of a ply folded on itself.

11. The tire according to claim 2 or claim 5, characterized by the fact that the wires or cables of the limiting block are arranged contiguous to each other.

12. The tire according to claim 2 or claim 5, characterized by the fact that the cables of the limiting block are formed of steel wires, have a cable lay of between 12 and 20 time the apparent diameter of the cable, and have a relative elongation less than 0.2% under a load equal to 10% of the rupture load of the cable.

* * * * *